United States Patent

[11] 3,614,198

| [72] | Inventors | Raymond J. Martin<br>Middlesex Borough;<br>Reinhard Ulrich, Matawan, both of N.J. |
|---|---|---|
| [21] | Appl. No. | 835,484 |
| [22] | Filed | June 23, 1969 |
| [45] | Patented | Oct. 19, 1971 |
| [73] | Assignee | Bell Telephone Laboratories, Incorporated<br>Murray Hill, Berkeley Heights, N.J. |

[54] THIN-FILM OPTICAL DEVICES
17 Claims, 21 Drawing Figs.

[52] U.S. Cl. .................................................. 350/96,
350/173, 350/175, 350/286, 356/74, 356/113
[51] Int. Cl. .......................................................... G02b 5/14
[50] Field of Search .......................................... 350/96 WG

[56] References Cited
UNITED STATES PATENTS

| 3,395,366 | 7/1968 | Snitzer et al. .................. 350/96 WG UX |
| 3,489,481 | 1/1970 | Osterberg et al. ............. 350/96 X |

OTHER REFERENCES

Shubert et al. " Optical Surface Waves on Thin Films and Their Application to Integrated Data Processors" IEEE Transactions on Microwave Theory and Techniques, Vol. MTT-16, No. 12, Dec. 1968, pp. 1048-1054. 350/96 (WG)

*Primary Examiner*—John K. Corbin
*Attorneys*—R. J. Guenther and Arthur J. Torsiglieri ABSTRACT: Thin-film optical devices are disclosed which function within the plane of a thin-film as lenses or prisms. They function in two dimensions, since the thin dimension of the film serves to guide the beam with respect to the third dimension. The devices are formed integrally from the body of the thin-film by variations in its thickness either along the path of the light beam or by such variations both along the path of the beam and transversely thereto, with contours of constant thickness intersecting the light path in an orientation affecting change of the direction of propagation of at least a portion of the light. Lenses of increased thickness are convergent if provided with convex contours or divergent if provided with concave contours; but lenses of decreased thickness with respect to the surrounding film are convergent if provided with concave contours and divergent if provided with convex contours. The prisms change the path of the entire beam. They can also be made to provide total internal reflection within the prism or frustrated internal reflection if disposed sufficiently close to another thin-film optical device. It is advantageous for the efficient operation of these devices if the mentioned changes in the film thickness are not abrupt but rather are tapered smoothly over a distance of several wavelengths of the light. This minimizes reflection losses and conversion to other modes.

INVENTORS R.J. MARTIN
R. ULRICH
BY
Wilford L. Wise
ATTORNEY

THIN-FILM TELESCOPE

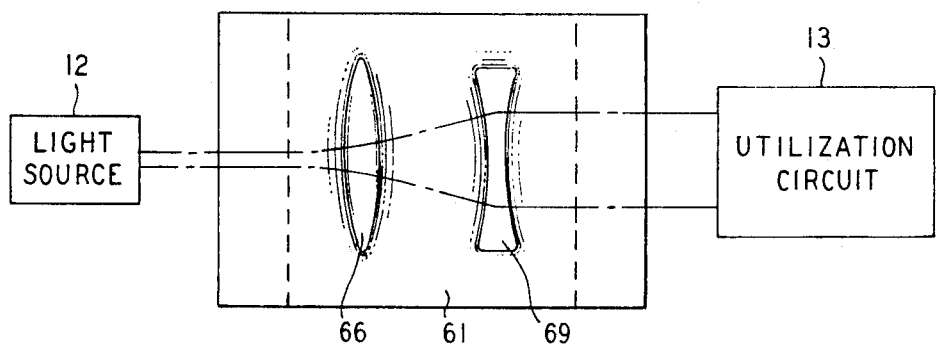
FIG. 5
THIN-FILM MICROSCOPE
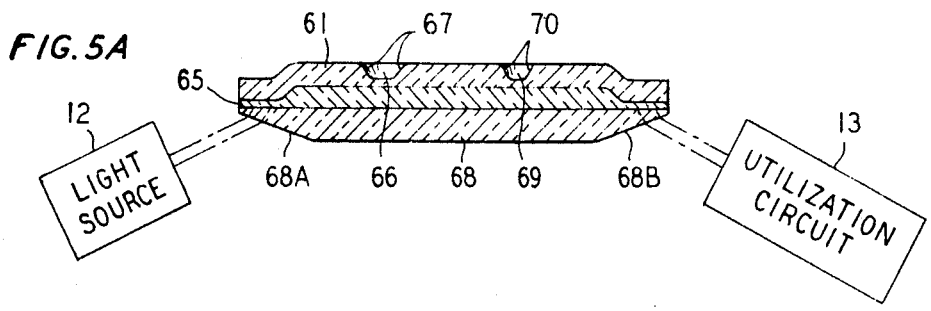
FIG. 5A
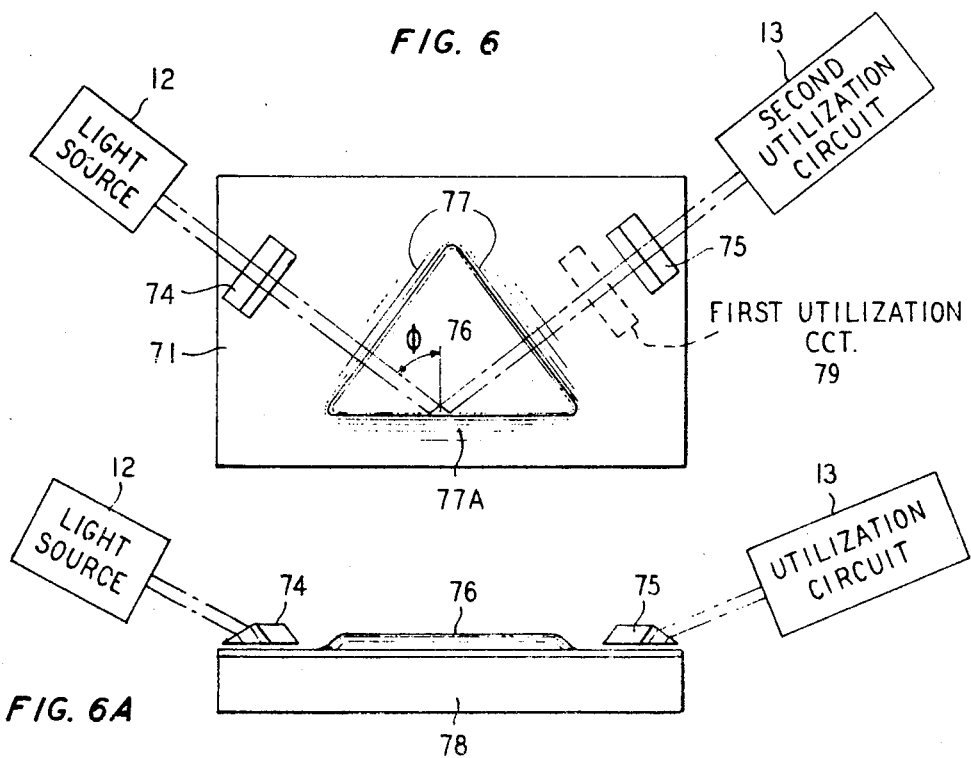
FIG. 6
FIG. 6A

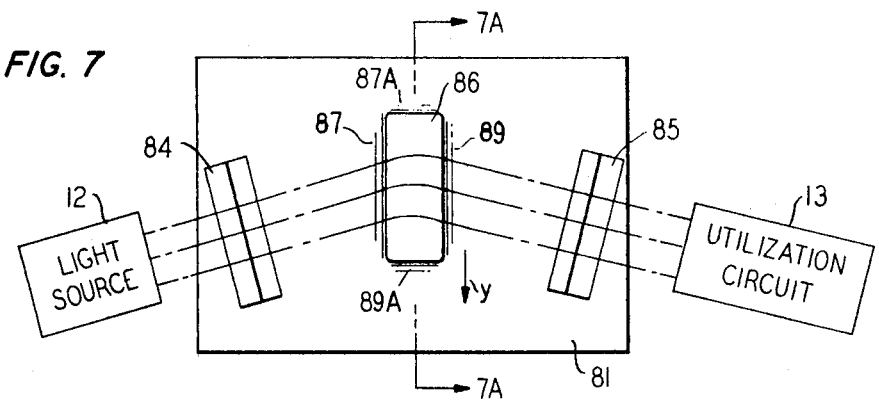
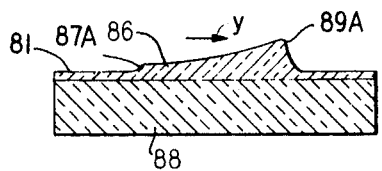
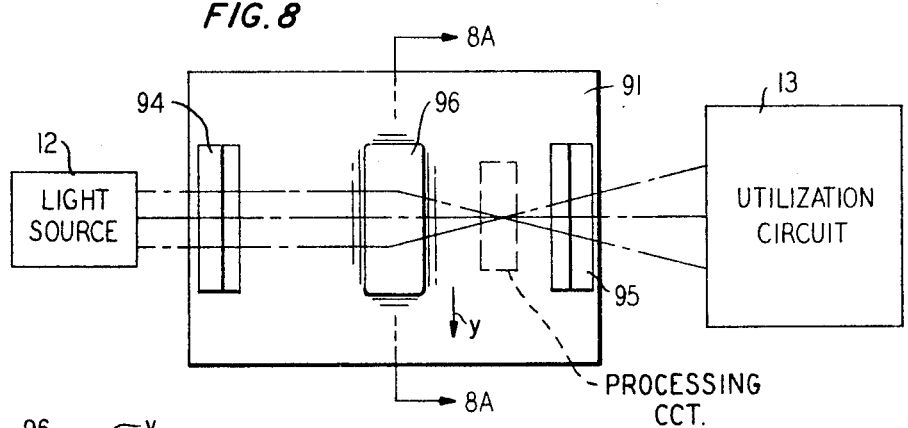
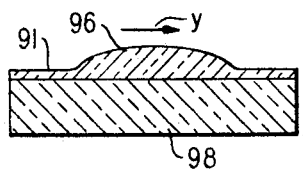
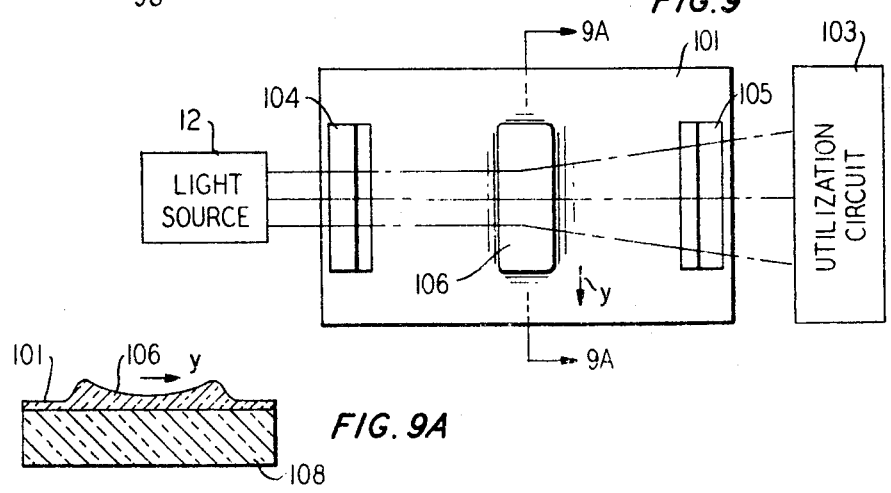
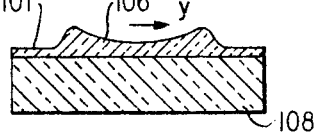

3,614,198

THIN-FILM OPTICAL DEVICES

BACKGROUND OF THE INVENTION

This invention relates to thin-film optical devices, particularly those devices within the body of a thin-film which facilitate manipulation of the light in a geometrical sense.

Dielectric light guides in the form of round or rectangular fibers have recently attracted new interest for application in laser beam circuitry. Various light guide elements, such as bends, directional couplers, filters, et cetera, have been suggested and have been studied theoretically and experimentally. All these devices are true wave-guiding elements in the sense that they restrict the propagation of light to essentially one dimension.

A thin dielectric film, deposited on a dielectric substrate of a refractive index lower than that of the film, exhibits all typical waveguide properties (modes, dispersion, cutoff) in its thin dimension, whereas the light propagation is unrestricted in its two broad dimensions. The propagation in such thin-film guide is two-dimensional, the light energy being confined to the film and its immediate vicinity in the third dimension. The thin-film guide, often also called "surface-waveguide," thus ranks intermediately between the one-dimensional optical fiber and the unrestricted, three-dimensional light propagation in a bulk crystal.

A thin-film guide may find important applications as a propagation medium by itself, e.g., in electrooptic devices requiring high concentration of light energy, or in conjunction with the one-dimensional laser beam circuitry mentioned above. The thin-film guide is potentially of considerable industrial importance because it can be fabricated by the same thin-film deposition techniques that are well established today for the production of electrical integrated circuits. Light, as used in this context, refers to electromagnetic radiation having a wavelength shorter than about 1000 $\mu$meters, which includes the infrared.

The problem of coupling a laser beam into a thin-film guide has been solved recently by the development of an efficient prism-film coupler, as described in the copending U.S. Pat. application of P. K. Tien, Ser. No. 793,696, filed Jan. 24, 1969 and assigned to the assignee hereof. Here it will be described now how a laser beam, once it is traveling in the thin-film guide, can be deflected and focused in the plane of the film, i.e., in those dimensions in which the thin-film does not guide. The structures to be described act on light beams guided in a thin-filmlike ordinary prisms and lenses act on ordinary light beams. Therefore, they will be called thin-film prisms and thin-film lenses.

The idea underlying these new devices is that the phase velocity of a guided wave depends on the thickness of the thin-film guide (FIGS. 1, 1A). When a guided beam of light passes from one area of the film of thickness $W^{(1)}$ into another area of a different thickness $W^{(2)}$, its phase velocity will change at the border line. The beam, when incident at an oblique angle will be refracted. Employing this basic scheme of refraction at a thickness step, the actions of prisms and of positive and negative lenses can be obtained. For this, the contours of equal film thickness have to be shaped properly. The experiments on this subject, conducted by us, are a repetition of the basic refraction experiments shown in a beginners course on optics, except that the medium of propagation is a light guiding thin-film here.

Nevertheless it is a nontrivial problem to be able to manipulate the beam in the plane of the film in order to prevent continual spreading of the light due to diffraction, to change its width or direction and to otherwise geometrically manipulate it. Most straightforward proposals for such manipulation involve excessive losses and complicated and impractical fabrication techniques. For example, see the article by R. Shubert et al., IEEE Transactions Microwave Theory and Technique, Vol. MTT-16, page 1048, Dec. 1968.

It is, therefore, desirable to provide thin-film optical devices within a thin-film which are easily fabricated and which avoid excessive losses of the device-to-film boundary.

SUMMARY OF THE INVENTION

Our invention is based on our discovery that a change in the thickness of a thin-film light guide of homogeneous material can produce both refraction effects like that of a prism and focusing effects like those of lenses, provided that contours of constant thickness intersecting the beam path are appropriately curved.

According to another feature of our invention, thin-film optical prisms and lenses may be provided by variations in the thickness of the thin-film not only along the path of the beam but also transverse to the path of the beam.

It is another feature of our invention that for all types of our thin-film optical devices, the variation in the thickness dimension of the thin-film occurs smoothly over a sufficient number of wavelengths so that negligible mode conversion is produced.

A further surprising feature of our invention is the discovery that thin-film optical lenses having convex contours of constant thickness provide divergent focusing if they are thinner than the surrounding thin-film; and those having concave contours of constant thickness provide convergent focusing if they are thinner than the surrounding thin-film.

It is a further advantage of our invention that all of our new thin-film optical devices are entirely compatible with the prism-film coupling technique disclosed in the above-cited patent application of P. K. Tien.

BRIEF DESCRIPTION OF THE DRAWING

Further features and advantages of the invention will become apparent from the following detailed description, taken in conjunction with the drawing, in which:

FIGS. 5 and 5A show plan and side elevation views of another modified compound lens embodiment of the invention employing lenses that are relatively thin compared to the surrounding thin-film material;

FIGS. 6 and 6A show plan and side elevation views of an internal reflection prism embodiment of the invention;

FIGS. 7, 7A, 8, 8A, 9 and 9A show modified embodiments of the invention in which the film thickness varies not only along the path of the beam but also transversely thereto;

DESCRIPTION OF ILLUSTRATIVE EMBODIMENT

Figure 1:
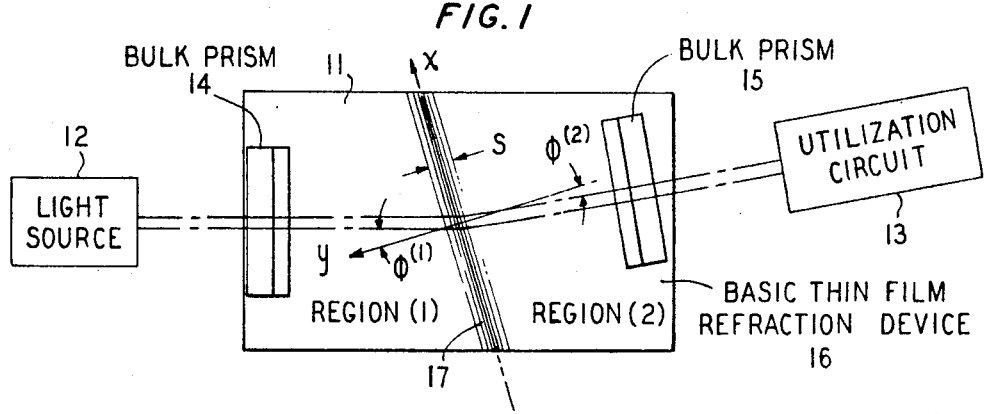
FIG. 1 is a partially pictorial and partially block diagrammatic plan view of the basic refraction device embodiment of the invention.

In the embodiment of FIG. 1 it is desired to change the direction of a light beam coupled into the region (1) of a thin-film II from a source 12 through the bulk prism 14 so that it will thereafter propagate toward the bulk prism 15 through which it can be coupled out of the thin-film to propagate toward utilization circuit 13. To accomplish this change in direction, a basic thin-film refraction device 16 according to our invention is provided in the thin-film 11 by increasing the thickness of the thin-film in a homogeneous manner, that is, there is no change in the composition of the thin-film. The basic refraction device 16 is defined by parallel contours of constant thickness intersecting the light beam path obliquely, with the thickness either increasing or decreasing in magnitude along the path of the beam. The shape and the contours of the prism 16 are more readily appreciated from the side elevation of FIG. 1A. The top surface of the thin-film 11 is very smooth since the thin-film is deposited by evaporation techniques. The thickness of the film in the tapered transition between the regions (1) and (2) varies smoothly over several light wavelengths, specifically, a sufficient number of light wavelengths that mode conversion and radiation losses of the guided light are negligible. This transition region may be designated region 17.

The fabrication of the thin-film device 16 and the transition region 17 is simply accomplished as follows. A thin-film 11 of the minimum thickness $W_1$ is deposited over the entire top surface of substrate 18 by vapor deposition, that is, by evaporation from a suitable source, according to conventional techniques. Zinc sulfide (ZnS) and zinc oxide (ZnO) have typically been employed in the fabrication of our experimental devices. The region (1) of thin-film 11 is then masked by a deposition mask and additional material, preferably homogeneous with that previously deposited, is then deposited by evaporation from a source of relative limited width elongated in the direction of the edge of the mask to produce the tapered transition by the penumbral diffusiveness of the shadow of the deposition mask. The mask is either spaced from the thin-film or is otherwise provided with a greater than conventional thickness, of the order of a few mils to provide a taper or transition region 17 with top surface preferably sloping at an angle less than 5° with respect to the bottom surface of the film.

It is noted that the extension or elongation of the source in the direction of the edge of the mask (the direction of transition 17) produces desirable averaging effects upon any unevenness in the penumbral diffuseness of the deposition. Thus, the transition region 17 is provided with an exceptionally smooth surface.

Figure 1A:
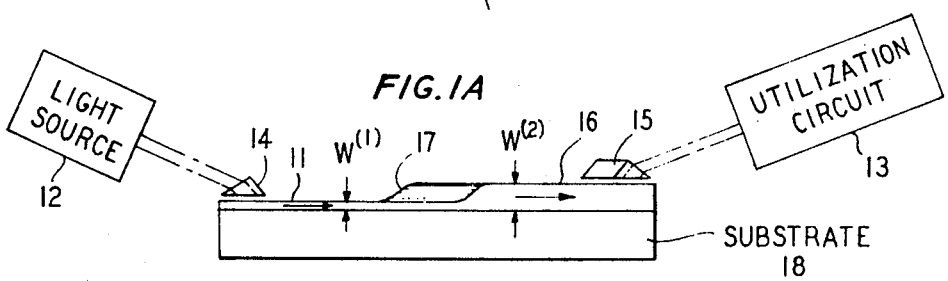
FIG. 1A shows a side elevation of a pictorial portion of the embodiment of FIG. 1, together with its block diagrammatic complement; $W^{(1)}$ and $W^{(2)}$ are the two different thicknesses of the film in the regions (1) and (2) of FIG. 1.

More specifically, in the embodiment shown in FIGS. 1 and 1A, the light source 12 may be a helium-neon laser operated at 632.8 nanometers. The utilization circuit 13 may be a detector. The thin-film 11 may be an evaporated zinc sulfide film deposited on a galss substrate 18, the index of refraction $n_1$ of the film being 2.35 and the index of refraction of the glass $n_0$ being 1.52. The bulk prisms 14 and 15 are rutile (Ti $O_2$), (index of refraction equals 2.86 when the light propagates as an extraordinary ray). The prisms 14 and 15 are, in practice, typically separated from the thin-film 11 by a very narrow and even gap. Because of residual dust on their neighboring surfaces they may need, in fact, to be clamped together with substantial pressure to reduce this gap to less than one wavelength of the incident light. The function of the bulk prisms 14 and 15 is more completely described in the above-cited copending patent application of P. K. Tien.

The thickness $W^{(1)}$ of the thin-film in the vicinity of bulk prism 14 is illustratively 60 nanometers, and its thickness $W^{(2)}$ in the vicinity of bulk prism 15 is illustratively 220 nanometers. This allows the propagation of a TE, $m=0$ mode. More generally, all of the thicknesses are preferred to be less than ten wavelengths of light being propagated; and the difference in the thicknesses of the surrounding thin-film and the prism or lens must be sufficient to produce the desired optical effect. If $n_2$ and $n_0$, the indices of the materials on either side of the thin-film, are unequal, the thicknesses $W^{(1)}$ and $W^{(2)}$ of the thin-film regions should be large enough to give real solutions to equation 2, below.

The operation of the embodiment of FIGS. 1 and 1A may be understood from the following analysis, which will show that the relative constant $\beta$ of propagation has the meaning of an effective index of refraction. This effective index is useful in predicting the effects which are analogous to those of bulk three-dimensional optics. The thin-film guide consists of a thin dielectric film of refractive index $n_1$ and thickness $W$, embedded between two media of refractive indices $n_0$ and $n_2$ (see FIG. 1, assuming that there $W^{(1)} = W^{(2)} = W$). Both $n_0$ and $n_2$ must be smaller than $n_1$ for guidance to be possible. The simplest type of wave that can propagate along the thin-film is a two-dimensional "linear" wave, in analogy to the three-dimensional "plane" wave. The electromagnetic field of this wave is, in vector components, $V(x,y,z,t) = -\sin\alpha, \cos\alpha, 0$ $\vec{V}_o(z) \cdot \exp[ik\beta(x\cos\alpha + y\sin\alpha) - i\omega t]$ (1)

For a TE wave, $\vec{V}$ and $V_o$ represent the electrical field strength, for a TM wave the magnetic field strength. The angle $\alpha$ is the azimuth of propagation in the $xy$ plane of FIG. 1, measured from the $x$-direction, and $k = 2\pi/\lambda_o$ is the vacuum propagation constant with $\lambda_o =$ vacuum wavelength. The factor $\beta$ appears in equation (1) as the propagation constant of the guided wave, relative to the vacuum propagation constant. Through the dispersion relation equation (2), the value of $\beta$ is determined implicitly by the parameters $W$, $n_0$, $n_1$, $n_2$ of the guide, and depends also on $\lambda_o$ through $k$ $$2kw[n_1^2 - \beta^2]^{1/2} - 2\arctan\frac{f_1}{f_2}\left[\frac{\beta^2 - n_2^2}{n_1^2 - \beta^2}\right]^{1/2}$$
$$- 2\arctan\frac{f_1}{f_0}\left[\frac{\beta^2 - n_0^2}{n_1^2 - \beta^2}\right]^{1/2} = 2m\pi \quad (2)$$

Here $f_i=1$ for TE modes and $f_i=n^2_i$ for TM modes, $i=0,1,2$. The integer $m=0,1,2,...$ is characteristic for each mode, it is the number of nulls of $V_o(z)$. For each fixed value of this mode number $m$, the equation (2) has a unique solution $\beta=\beta_m(W)$. This function is monotonically increasing, $\beta_m, W>0$, and it is limited by $n_0 < \beta_m(W) < n_1$. The phase velocity of the wave described in equation (1) is $Y_{ph}=c/\beta$ (3) where $c =$ speed of light in vacuum. This equation (3) is completely analogous to the expression equation (4) for the phase velocity of an ordinary plane wave in a homogeneous bulk medium of refractive index $n$ $Y'_{ph}=c/n$ (4)

Actually this correspondence between the bulk refractive index $n$ and the parameter $\beta$ of the thin-film guide is more than an analogy. It will be shown now that $\beta$ has the full meaning of a refractive index for the guided wave, in the sense of Snell's law of refraction.

It is assumed for the moment that the width $s$ of the thickness step (FIG. 1) is negligible, and that the step height is small $(W^{(2)} - W^{(1)}) >> \lambda$. Let the wave of equation (1) be incident as $\vec{V}^{(1)}$ from the region of thickness $W^{(1)}$ on the boundary line $x=0$. In order to fulfill the boundary conditions there, a transmitted wave $\vec{V}^{(2)}(x,y,z,t,)=[-\sin\alpha^{(2)}, \cos\alpha^{(2)}, 0\ V_o^{(2)}(z)$ ...... $\exp[ik\beta^{(2)}(x\cos\alpha^{(2)} + y\sin\alpha^{(2)}) - i\omega t]$ (5) has to be assumed in the region $y<0$ with an as yet undetermined azimuth $\alpha^{(2)}$ and amplitude $V_o^{(2)}(z)$, moreover a reflected wave in the region $y>0$, and, to be complete, also a field of outgoing waves representing the radiation loss at the thickness step. In the plane $y=0$ the tangential components of the fields in the two regions $y>0$ and $y<0$ must be equal at all $x$ and all $t$. From this it follows that the exponentials of equation (1) and equation (5) must become identical at $y=0$, or $\beta^{(2)}\cos\alpha^{(2)}=\beta^{(1)}\cos\alpha^{(1)}$. This relation expressed in terms of the angles of incidence $\Phi^{(1)}$ and of refraction $\Phi^{(2)}$ (FIG. 1), is Snell's law for a thin-film guide $$\beta^{(1)}\sin\Phi^{(1)}=\beta^{(2)}\sin\Phi^{(2)} \quad (6)$$

This relation shows that $\beta$ really is the effective index of refraction for the guided beam. As a consequence, a light beam guided in a thin-film will bend when it passes from one region of the film into another region of different thickness, except in the case of normal incidence on the boundary line. Because of $\delta\beta_m/\delta W>0$, the thicker region of the film has always the higher effective index $\beta$ of refraction. This refraction has been observed experimentally on thin-film guides consistof a He–Ne laser ($\lambda_0$=632.8 nm.) was fed into the thin-film guide as a TE, $m$=0 mode by means of a prism film coupler, as described in the copending patent application of P. K. Tien, Ser. No. 793,696, filed Jan. 24, 1969, and assigned to the assignee hereof. The film thicknesses used were $W^{(1)}$=60 nanometers and $W^{(2)}$=220 nanometers, and the observed refraction was in accordance with equation (6).

In deriving Snell's law equation (6) the step has been assumed to be abrupt. The relation equation (6) is valid, however, also for a *tapered* transition of the film thickness from $W^{(1)}$ to $W^{(2)}$: The tapered transition may be considered as the limiting case of a multiply-stepped transition. According to equation (6), the numerical aperture $A=\beta \sin \Phi$ of a guided beam remains invariant at each step and, thus, also between the regions $W^{(1)}$ and $W^{(2)}$. By this same argumentation it is recognized that the angle $\Phi$, measured along a guided beam, is a continuous function of the film thickness $$\Phi = \arc \sin (A/\beta_m(W)) \quad (7)$$

if the thickness $W$ does not depend on the $x$ coordinate. In a region of constant film thickness the angle $\Phi$ is constant along the beam, i.e., the beam propagates along a straight line. Inversely, in a region of nonuniform film thickness $W(xy)$, the beam direction $\Phi$ changes along the beam and its path is curved. The radius $\rho$ of curvature can be shown to follow from $$\frac{1}{\rho} = \frac{1}{\beta}\left(\frac{\partial \beta}{\partial x} \cos \alpha + \frac{\partial \beta}{\partial y} \sin \alpha\right) \quad (8)$$

with $\beta=\beta(W(x,y))$.

The case of a tapered transition from $W^{(1)}$ to $W^{(2)}$ is of considerable practical importance for several reasons: If the taper is sufficiently smooth ($\rho>>\lambda_0/\beta$ or, equivalently, if the taper angle is small, preferably less than about 5°, although it could be as much as 10°) all energy losses at the step become negligible. Such losses could be caused at the transition by reflection, by radiation into nonguided modes, and by conversion into modes of different $m$. The vanishing of these losses in the limit of a smooth taper follows, e.g., for the reflection losses, again by a subdivision of the total step into many smaller steps. The power reflected at the $p$-th substep is approximately proportional to $(\beta^{(p+1)}-\beta^{(p)})^2$. As the substeps are made finer, this power decreases faster than the number of steps increases. Similar considerations show the vanishing of the other losses too. Provided the taper is smooth, its actual profile does not affect the complete transfer of energy over the step. This is important for the preparation of these steps by vacuum depositing the additional film thickness $W^{(2)}-W^{(1)}$ through a mask. A tapered transition can easily be produced by leaving a finite gap (in the order of a few mils) between the mask and the primary film $W^{(1)}$, or by employing a mask of selected thickness, typically greater than that of a conventional diffusion mask. Evaportion from a source of finite size will produce tapered transition by penumbral diffuseness of the shadow of the mask.

In the embodiment of FIG. 1 it is noted that refraction of the entire beam was obtained by linear, parallel contours of constant thickness that intercept the beam path obliquely. Modified refraction effects affecting only portions of the beam can be obtained at either normal or oblique incidence of the beam with respect to the contours of constant thickness if the contours are appropriately curved.

Figure 2:
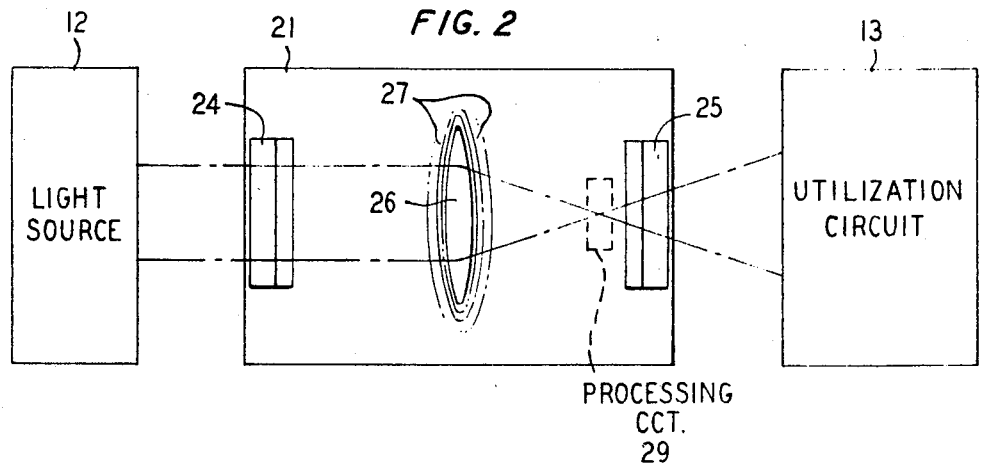
FIGS. 2 and 2A show partially pictorial plan and side elevation views of a basic lens embodiment of the invention, together with components of the apparatus shown block diagrammatically.

Thus in the embodiment of FIG. 2, the effect of a converging lens is obtained by convexly curved contours of constant thickness; that is, the first contours encountered by the beam have their center of curvature in the forward direction with respect to the path of the beam and the last contours encountered by the beam have their centers of curvature in the backward direction with respect to the path of the beam. Therein lies the difference between the embodiments of FIGS. 1 and 2.

Figure 2A:
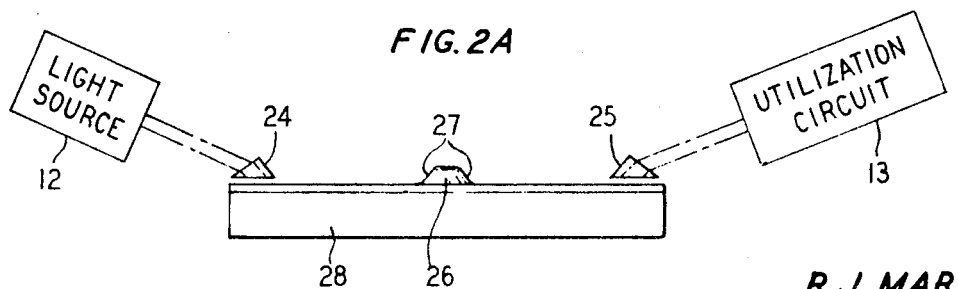

More specifically, in the embodiment of FIG. 2 light is propagated from the light source 12 through the coupling prism 24 into thin-film 21 as in FIG. 1. A lens 26 is formed in thin-film 21 as a region of increased thickness with smoothly tapered edges of the same type as employed in the prism 16 of the embodiment of FIG. 1 except that the contours 27 of constant thickness are curved convexly, as just defined. The shape of lens 26 may be more completely appreciated by comparing the side elevation of FIG. 2A with the plan view of FIG. 2. Here again, the surrounding thin-film 21 is illustratively 60 nanometers in thickness and the thickness of lens 26 of the same material is 220 nanometers, if the propagated light has a vacuum wavelength of 632.8 nanometers.

In operation the lens 26 converges a diverging beam incident thereon in thin-film 21. The mathematical description of the refraction is similar to that employed above for prism 16 except that the angle of incidence of various lateral portions of the beam upon the contours 27 of prism 26 become progressively greater toward the outer edges of the beam, so that a greater amount of refraction occurs at the outer edges. Application of the equivalent of Snell's Law developed above as equation (6) shows that, for the increased thickness, the effect is to converge the beam.

Another modification of the embodiment of FIG. 1 which should be apparent at this point is the use of prisms which employ two different regions of varying thickness along the path of the beam. The resulting operation can then be determined by successive applications of the principles of equation (6) above.

Figure 3:
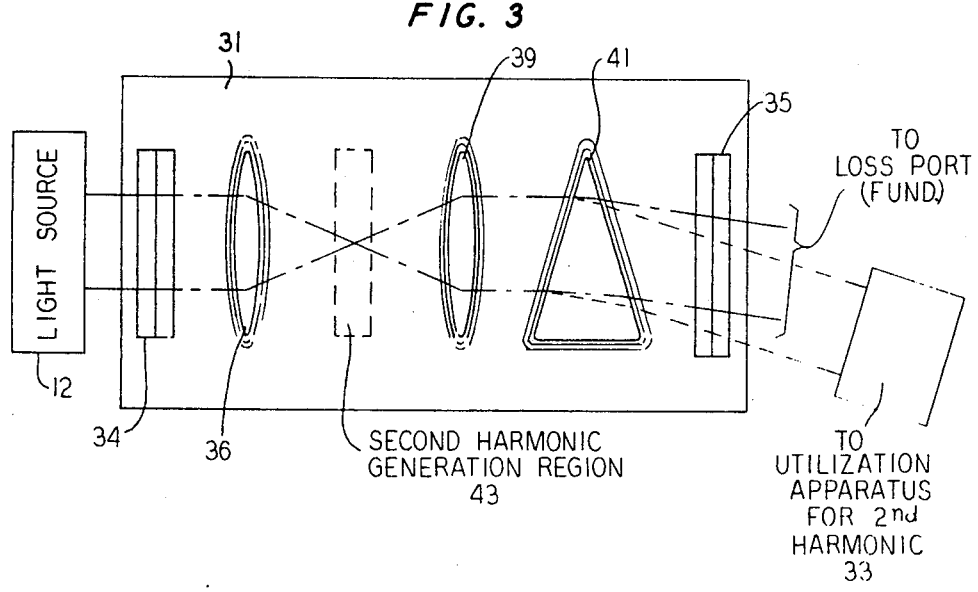
FIG. 3 is a partially pictorial and partially block diagrammatic illustration of a compound embodiment of the invention (a thin-film prism spectroscope)

Thus in FIG. 3 an illustrative arrangement is provided which bends the path of the beam as well as focusing it for optimum second harmonic generation effect in a suitable region 43 of a thin-film 31 and then recollimating it. The thin-film optical devices according to the present invention which are employed in FIG. 3 are the converging lens 36, the recollimating lens 39, and the triangular prism 41. The relative thicknesses employed and the materials employed can be the same as for FIGS. 1 and 2 above. Illustratively, the second harmonic generation is assumed to occur in the region 43. This process is especially efficient due to the high field strength in the focus of the lens 36. The process of second harmonic generation itself may be designed as is explained in the copending patent application of P. K. Tien, Ser. No. 817,678, filed Apr. 21, 1969. The prism 41 is used to separate the remaining fundamental beam from the generated second harmonic beam.

Figure 4:
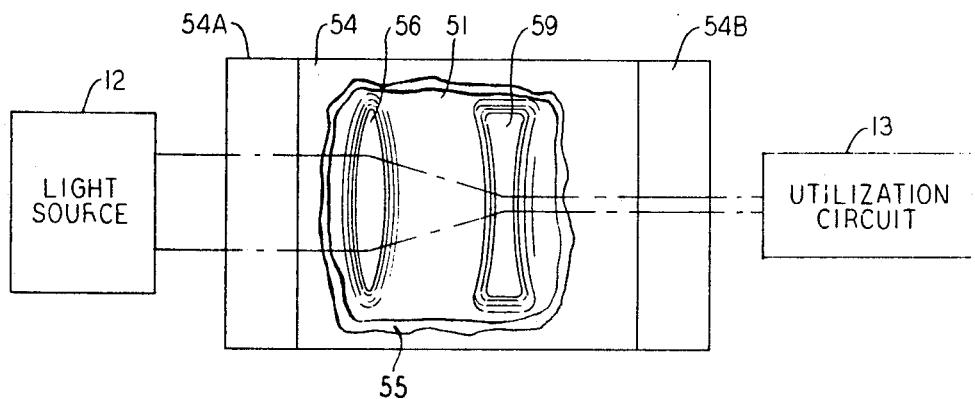
FIGS. 4 and 4A shown plan and side elevation views of a modified compound lens embodiment of the invention (a thin-film telescope)
Figure 4A:
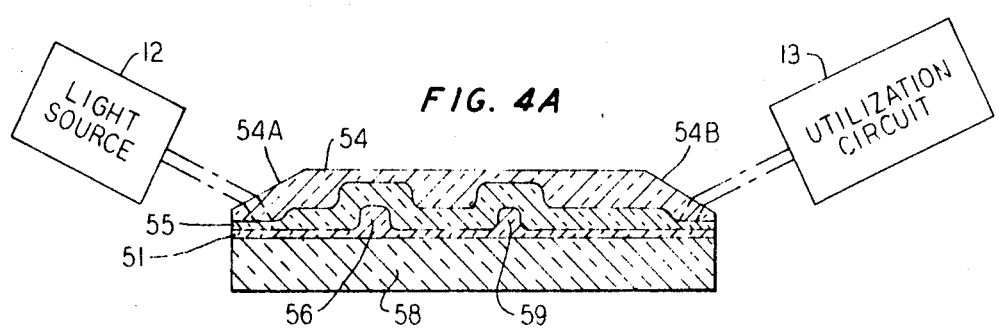

For many applications it may be desirable to employ the devices of the present invention in a context in which it is not convenient to press bulk coupling prisms such as 34 and 35 against the film. In FIGS. 4 and 4A, which illustrate a thin-film telescope, it is shown how a separate, thick film 54 with appropriately beveled edges 54A and 54B may be employed to replace the coupling prisms. The film 54 has a higher refractive index than that of the substrate 58 but is separated from thin-film 51 by a very thin layer 55 of a low-index dielectric material (e.g. glass, $n$=1.50) which provides the coupling gap. This gap is illustratively 200 nanometers thick. Outside the immediate coupling regions underneath 54A and 54B, the thickness of the film 55 is increased to 1,000 nanometers, illustratively, in order to provide good insulation of the film 51 and lenses 56 and 59 from the film 54. Before the thin-films 51 and 54 are deposited, the converging lens 56 and the divergent lens 59 are formed with appropriately shaped contours and provide the two-dimensional thicnkess effect characteristic of the present invention. It will be recalled that the regions 56 and 59 are formed by vapor deposition through masks of appropriate thickness or spacing from thin-film 51 so that the penumbral diffusiveness of the shadow of the mask produces the smooth tapered transition.

In striking contrast to bulk three-dimensional optics, it is possible to devise thin-film lenses according to our invention which produce convergent focusing with concave curvatures of the entrance and exit surfaces, as defined above, and divergent focusing with convex curvatures of the entrance and exit surfaces, as defined above. Such a modification of the invention is shown in FIGS. 5 and 5A, which illustrates a thin-film device that functions as a microscope. These anomalous focusing effects are achieved by making the lenslike optical devices as thinner sections of the thin-film, e.g., regions 66 and 69 in thin-film 61, than the surrounding regions of thin-film 61. For the case in which the substrate 68 is of a high-index material of the type described for the preceding embodiments, the prisms may be replaced by appropriately beveled surfaces 68A and 68B of the substrate 68, which is then separated from thin-film 61 by clear, low-index dielectric material 65, forming a gap of suitably low thickness in the coupling regions near 68A and 68B and of high thickness elsewhere.

The operation of this embodiment accords with equation (6) above. In the lens examples, FIGS. 2, 3, 4, the optical element is formed by *increasing the thickness* of the guide in properly shaped areas to form the lenses. The thin-film guide has a higher effective index $\beta^{(2)}$ of refraction in these areas than $\beta^{(1)}$ in the surroundig area, which merely serves as a transmission medium. The relative refractive index of the lens is $\beta_{rel} = \beta^{(2)}/\beta^{(1)} > 1$. This situation corresponds to ordinary optics where lenses et cetera have a refractive index larger than unity. The other alternative, to employ optical elements of a refractive index lower than that of the surrounding propagation medium $\beta_{rel} < 1$, is normally not possible in ordinary optics. In two-dimensional thin-film optics, however, this alternative can be realized with equal ease as the $\beta_{rel} > 1$ case, by using the complementary pattern for the second deposition, so that the optical elements are *thinner than their surroundings*. Applications of this possibility of $\beta_{rel} = \beta^{(2)}/\beta^{(1)} < 1$ to the formation of a prism and of lenses are sketched in FIGS. 5 and 5A. In all elements of all FIGS. of the drawings the edges are assumed to be tapered. If the width $s$ of the tapers (see FIG. 1) is negligible compared to the other dimensions of these elements, all geometrical-optical properties (deflection angles, focal lengths, position of principal lines, et cetera), can be computed from the formulae of ordinary geometrical optics, using the effective indices $\beta$ of refraction.

Another extension or modification of the embodiment of FIG. 1 is the arrangement of a suitable thin-film prism to obtain total internal reflection, as shown in the modified embodiment of FIG. 6. We have found that a critical angle $\Phi_c$ can be defined for a thin-film prism such as prism 76. When $\Phi$ is greater than $\Phi_c$, total internal reflection will occur in the sense that the beam path is changed toward another edge of prism 76 at the smoothly tapered edge 77a of prism 76.

In the preceding discussion it was tacitly assumed that the mode under consideration can exist in both the regions $W^{(1)}$ and $W^{(2)}$ as well as in the transition region, and moreover that Snell's law equation (6) gave a value $\sin \Phi^{(2)} < 1$ for the angle $\Phi^{(2)}$ of refraction. When, however, the beam is incident from a region of high $\beta^{(1)}$ on the border to a region of lower $\beta^{(2)}$, a critical angle exists:

$$\Phi_c^{(1)} = \arc \sin (\beta^{(2)}/\beta^{(1)}) \quad (9)$$

If the angle of incidence $\Phi^{(1)}$ exceeds this critical angle, equation (6) has no real solution for $\beta^{(2)}$ and the incident beam is totally reflected at the $\beta$ step.

This total reflection has been observed at the ZnS films on glass mentioned earlier. The light beam was incident as a TE, $m=0$ mode from the thicker region on the step to the thinner area. A critical angle of 50° was observed, in fair agreement with the value following from equation (9). The thickness step being a tapered one, it was observed that the streak was not reflected with a sharp bend, it rather was curved smoothly with a minimum radius of curvature in the apex.

Another type of total reflection occurs when the mode $m$ incident from the high-index region does not exist in the lower index region. This situation is given, in particular, if $W^{(2)}=0$, i.e., at the very edge of the film $W^{(1)}$. For example, in FIG. 6, if there would be no part of the film 71 beyond edge 77A of prism 76, then this condition would exist. In such case, the refractive index $n_0$ of the substrate plays the role of $\beta^{(2)}$ in determining the critical angle (assuming $n_2 < n_0$)

$$\Phi_{c,edge} = \arc \sin (n_0/\beta_m^{(1)}) \quad (10)$$

The existence of this critical angle can be understood for a tapered edge from equation (7). As the beam approaches the edge, the thickness $W$ decreases and the angle $\Phi$ increases. If the beam was originally incident from a large angle $\Phi^{(1)}$, it will penetrate only weakly into the tapered edge before it reaches $\Phi=90°$ and is then totally reflected. For a low original $\Phi^{(1)}$, however, the beam penetrates deeper into the tapered region. It reaches a depth D into the taper where the original mode $m$ ceases to exist. Describing the mode as a plane wave zigzag reflected between the surfaces of the guide, the limit of existence of this mode is reached at a depth D where the angle of incidence $\Theta_1$ of these plane waves on the top and bottom surfaces drops below one of the two critical angle between the film $n_1$ and its vicinity $n_0$, $n_2$. Yet, light propagation by zigzag reflection does not stop at D, rather the reflection is no longer a total one beyond D, and the guide becomes leaky there. With $n_2 < n_0$, the light thus will leak out into the substrate, where it will propagate practically parallel to the $xy$ plane. From the dispersion relation equation (2) it follows that $\beta = n_0$ at depth D. The critical angle $\Phi_c^{(1)}$ of incidence may now be characterized as that angle for which $\Phi \to 90°$ at D, or by a critical numerical aperture $A_c = n_0$. With this, equation (10) becomes a consequence of equation (7).

If the edge is sharp, i.e., nontapered, the existence of the critical angle equation (10) for total reflection at the edge can be shown by an argumentation similar to the one used to derive equation (6). It has to be noted, that $k\beta = kn_0$ is the highest value possible for the $xy$ components of the propagation vector of a wave *freely* propagating in the vicinity ($n_0, n_2$) of the film. From an incident guided beam with $A > n_0$, no such freely propagating wave can be excited, the beam must be totally reflected. If $A < n_0$, a part of the incident energy willbe reflected at the edge, the rest is radiated into the substrate. For a smoothly tapered edge, the reflected part becomes negligible.

This total reflection of light at the edge of a film was observed also at the ZnS film mentioned earlier. For angles of incidence lower than given by equation (10), the beam was found to leave the thin-film at the edge and to continue in the substrate.

Whereas the optical devices described thus far may be termed "lumped" since the refraction occurs at a fairly narrow localized region of changing thickness, it is also possible to design "distributed" prisms and lenses in the thin-film guide. These are shown in FIGS. 7-9A. Here it is not so much the shape of the area of increased thickness that determines the optical properties, but rather the thickness distribution inside the area of changed thickness, illustratively of rectangular shape. Due to the nonuniform film thickness, all light beams are curved in these devices. The prism of FIGS. 7 and 7A requires a profile $W^{(2)} = W^{(2)}(y)$ which has a constant gradient $\beta/y$. According to equation (8) this results in a beam curvature independent of $y$. Similarly, the shape of the contours of constant thickness of the lenses in FIGS. 8 and 9 can be determined from $^2\beta/y^2 = $ const, resulting in a parabolic $y$ dependence of $\beta$. For FIGS. 7A, 8A and 9A, the necessary profiles $W^{(2)}(y)$ can be expressed analytically with the help of equation (2). The actual fabrication of this type of optical element may be done by vacuum deposition through a mask that is moving in the $y$ direction of FIGS. 7A, 8A and 9A with programmed velocity.

More specifically, in FIGS. 7 and 7A the thin-film prism 86 may be rectangular in the plan view but illustratively slopes from side to side, as shown in the sectional view of FIG. 7A, from a maximum thickness of 220 nanometers at the right-hand maximum to a thickness of 60 nanometers at the start of the left-hand tapered edge 87, for a vacuum wavelength of 632.8 nanometers, and a TE, $m=o$ mode.

In the lens embodiment of FIGS. 8 and 8A, the plan view again shows a rectangular structure as the lens 96 and the sectional view of FIG. 8A shows a convex lateral thickness variation which reaches a maximum thickness of 220 nanometers at the center and blends smoothly through the tapered edges into the 60 nanometer thickness of the surrounding thin-film 91. The lens element 96 produces a convergent focusing effect, as shown.

A divergent focusing effect is achieved in the modified embodiment of FIGS. 9 and 9A by a concave lateral variation in thickness, as shown in the sectional view of FIG. 9A. Again, the thin-film 101 may be about 60 nanometers in thickness and the lens region 106 varies from a maximum thickness of about 220 nanometers to a minimum thickness along the center of the path of the beam of about 60 nanometers, under the same conditions as above.

Total reflection at the edge of a thin-film guide may find an application in some thin-film lasers (not shown), such as that proposed by A. Ashkin in U.S. Pat. No. 3,197,715, issued July 28, 1965. If the lasing thin-film is fixed to a substrate of a refractive index sufficiently low so that a critical angle (equation 10) of $\Phi_c < 45°$ is obtained, a totally reflecting thin-film prism (not shown) may be used as the rooftop reflector at one or both ends of the laser. In contrast to the total reflection of such prism, the reflectivity of the film edge, used at normal incidence as the reflector in ordinary semiconductor junction lasers, is only of the order of $(n_1-1)^2/(n_1+1)^2$ which is typically about 0.30. The higher reflectivity of the prism should reduce the threshold of a given laser or allow the construction of shorter lasers. The significance of this can be estimated from the quoted absorption coefficients of $\alpha_c = 20-100 cm.^1$ for typical GaAs laser material: For a laser length of 0.5 mm., the output losses at each end amount to 0.2-1.0 times the single pass absorption losses. Thus, the prism could provide substantial improvement for short lasers of low loss material. The use of a prism at only one end of the laser leaves the other end available for output coupling. With two prisms, the laser essentially becomes a ring laser. Some output would still be available here by light scattering at irregularities of the reflecting surfaces. If $\Phi_c < 45°$ cannot be achieved for some reason, a polygonal structure may be an alternative.

Figure 10:
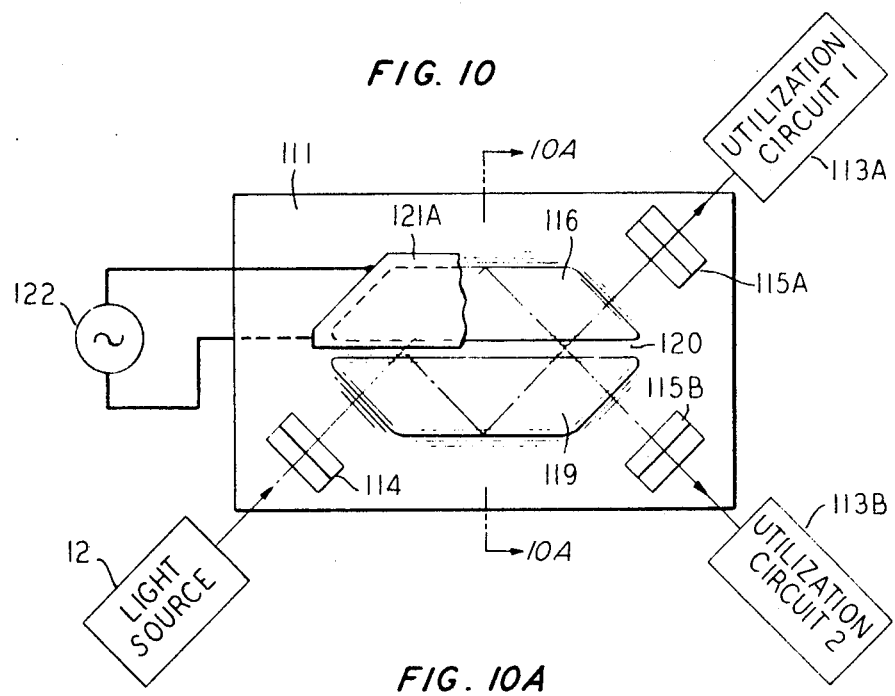
FIG. 10 is a partially pictorial and partially block diagrammatic illustration of an interferometric modulation embodiment of the invention employing totally reflecting prisms and frustrated internal reflection.
Figure 10A:
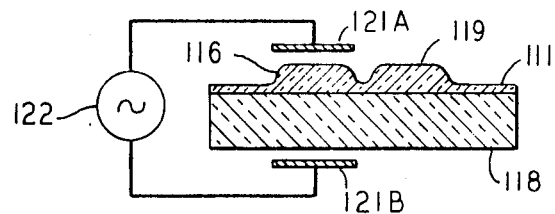
FIG. 10A is a partial sectional view of the thin-film device portion of FIG. 10.

Another modified embodiment of the invention employing frustrated internal reflection is shown in FIGS. 10 and 10A. From the close analogy between the propagation of two-dimensionally guided waves and the ordinary, three-dimensional wave propagation it must be concluded that also the phenomenon of frustrated total reflection exists for the guided waves. Some experimental observations could indeed be explained that way. The appropriate technique is to fabricate a sufficiently narrow ($<\lambda_0$) strip of reduced thickness, i.e., of reduced index $\beta$ of refraction. At such strip, a fraction of the incident light energy would be reflected, and the rest would be transmitted. It may be feasible, therefore, to use such strip as a beamsplitter for guided light beams, e.g., in a Mach-Zehnder type interferometer.

FIG. 10 is a sketch of such arrangement. The strip has the narrow width $h$ and belongs to the low $\beta$ region. In the regions 116 and 119 $\beta$ is assumed to be so high that the critical angle is less than 45° at region 120. The incident beam is split, therefore, and the two parts are totally reflected at the other tapered edges. Then they are partly recombined at the right-hand portion of region 120 and form the output beams I and II in the usual way.

This type of interferometer could also be used as a light modulator if the guiding film 116 consists of an electro-optic material or if it is deposited on an electro-optic crystal as substrate. Sandwiching one-half of the interferometer between the plates 121A and 121B of a capacitor (see FIG. 10) would allow to change the $\beta$ of the substrate by an applied electric voltage. The resulting change in the optical path length would thus modulate the ratio by which the incident light energy is distributed between the two output beams. Compared with other modulators, this arrangement appears advantageous since in the thin-film guide the light beam can be concentrated, at least in one dimension, to the ultimate limit. Consequently, the plates of the capacitor can be brought very close together. Thus, the amount of electrical energy that must be stored in the capacitor for a given phase shift is minimized. This means minimum driving power or, equivalently, maximum bandwidth. The minimum thickness $t$ of the substrate in FIG. 10 has to be several penetration depths of the fields of the light wave, i.e., $t >> \lambda/(\beta^2 - n_0^2)^{1/2}$ in order to avoid absorption of light by the electrodes. An equivalent minimum separation has to be observed in the medium $n_2$.

Figure 11:
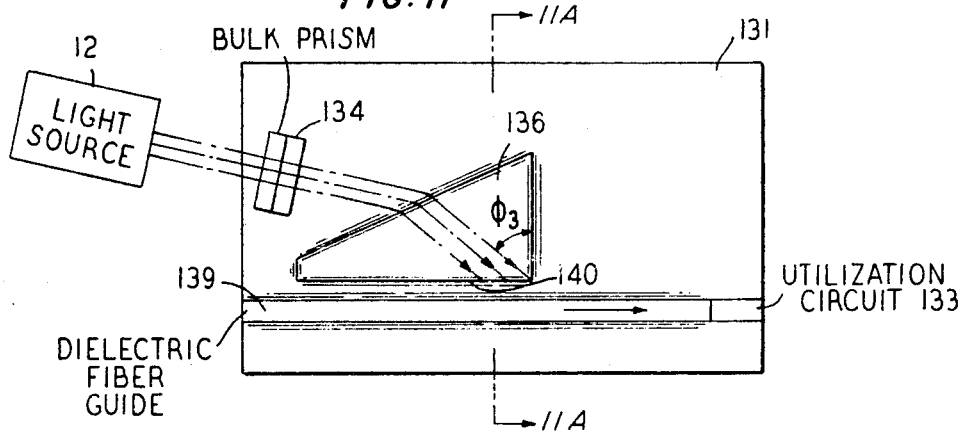
FIGS. 11 and 11A show plan and side elevation views of a frustrated internal reflection prism embodiment of the invention employed for coupling into a small rectangular dielectric light waveguide.
Figure 11A:
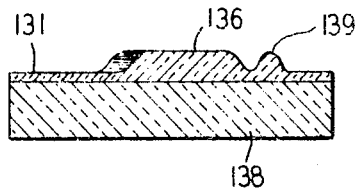

As a final example of the application of frustrated internal reflection, a two-dimensional modification of the prism-film coupler of the first above-cited copending patent application of P. K. Tien is shown in FIGS. 11 and 11A. The coupling step of interest nevertheless employs a thin-film prism 136 according to our invention. This prism is in contrast to the bulk prism 134 which provides coupling of the light beam from source 12 to thin-film 131 according to the teachings of the above-cited copending patent application. This arrangement, e.g., prism 136, is illustratively used to feed light from the thin-film 131 into an essentially one-dimensional dielectric waveguide 139 of approximately rectangular cross section. It would be virtually impossible to couple the light directly from source 12 into the guide 139 by means of the bulk prism 134. Nevertheless, by breaking the coupling down into two steps and employing a thin-film prism 136 according to our invention at the second coupling step, the desired result is obtained.

More specifically, the effective gap between the adjacent tapered edges of prism 136 and guide 139 is made sufficiently small that coupling of the evanescent waves is possible. It will be noted that the lower portions of the tapered edges blend into each other; and it is not necessary that the separation of the upper portions of the tapered edges be less than one-half wavelength.

The principle of operation of the embodiment of FIGS. 11 and 11A is otherwise analogous to the prism-film coupling arrangement disclosed in the first above-cited copending patent application of P. K. Tien. For example, the basic condition for phase matching the evanescent fields at the prism base 140 with those in the guide 139 is $\beta_{136}x \sin\Phi_3 = \gamma$, where $\gamma x 2\pi/\lambda_0$ is the propagation constant of the guide 139. $\lambda_0$ is the free space wavelength of the light.

While it is preferred that the thin-film be homogeneous in composition throughout thickness changes, changes in composition of the material, associated with a change in thickness, are also within the scope of the invention.

We claim:

1. An optical device of the type comprising a body of optically transparent material having one dimension comparable to the wavelength of light to be propagated therein, having a transverse dimension of magnitude substantially greater than the width of the beam of said light and having at least one smooth surface defining a limit of said one dimension, said device being characterized in that the bulk index of refraction, $n$, of said body at the wavelength of said light is constant throughout said body but said one dimension varies in magnitude along the intended path of said light thereby varying the relative phase constant, $\beta$, of said body throughout the region of variation of said one dimension, said one dimension varying with transverse contours of constant magnitude intersecting at least a portion of siad light obliquely, said device affecting change of direction of propagation of said portion of said light.

2. An optical device of the type claimed in claim 1 in which the one dimension of said body varies in magnitude along the path of propagation of said light with transversely linear contours of constant magnitude intersecting said path obliquely, whereby said path is bent.

3. An optical device of the type claimed in claim 2 in which the one dimension of said body decreases in magnitude along the path of propagation of said light with transversely linear contours of constant magnitude intersecting said path obliquely at an angle greater than the critical angle for reflection of said light.

4. An optical device of the type claimed in claim 1 in which the one dimension of said body varies in magnitude along the direction of propagation of said light with transversely curved contours of constant magnitude intersecting said path, said curved contours affecting change of direction of propagation of the light at the edges of said path with respect to the direction of propagation of the light in the center of said path.

5. An optical device of the type claimed in claim 4 in which the one dimension of said body increases in magnitude along the path of propagation of said light with transversely curved contours having centers of curvature located in the forward direction along said ptah to provide convergent focusing of said light.

6. An optical device of the type claimed in claim 4 in which the one dimension of said body decreases in magnitude along the path of propagation of said light with transversely curved contours having centers of curvature located in the backward direction along said path to provide convergent focusing of said light.

7. An optical device of the type claimed in claim 4 in which the one dimension of said body increases in magnitude along the path of propagation of said light with transversely curved contours having centers of curvature located in the backward direction along said path to provide divergent focusing of said light.

8. An optical device of the type claimed in claim 4 in which the one dimension of said body decreases in magnitude along the path of propagation of said light with transversely curved contours having centers of curvature located in the forward direction to provide divergent focusing of said light.

9. An optical device of the type claimed in claim 1 in which the one dimension of said body first increases then decreases in magnitude in a limited area along the path of propagation of said light to provide a limited region of increased relative phase constant, $\beta$ throughout the area of expansion of said one dimension.

10. An optical device of the type claimed in claim 1 in which the one dimension of said body first decreases then increases in magnitude in a limited area along the path of propagation of said light to provide a limited region of decreased relative phase constant, $\beta$ throughout the area of contraction of said one dimension.

11. An optical device of the type claimed in claim 1 in which the one dimension of the body varies not only along the path but also transversely to the path.

12. An optical device of the type claimed in claim 11 in which the one dimension of the body varies monotonically transversely to the path to bend the path.

13. An optical device of the type claimed in claim 11 in which the one dimension of the body varies transversely to the path in a curved symmetrical fashion with respect to the path.

14. An optical device of the type claimed in claim 1 in which the one dimension first decreases along a direction oblique to the path to an extent which would provide reflection of light propagating in said path and then increases along a geometrical extension of said direction to an extent to frustrate said reflection.

15. An optical device of the type claimed in claim 1 in which the one dimension of the body varies smoothly throughout a sufficient plurality of light wavelengths along the path to prevent substantial mode conversion of said light.

16. An optical device of the type claimed in claim 15 in which the one dimension of the body varies throughout a pathlength distance such that the angle formed by the upper surface with respect to the lower surface at no point exceeds about 10°.

17. An optical device of the type claimed in claim 15 in which the one dimension of the body varies throughout a pathlength distance such that the angle formed by the upper surface with respect to the lower surface at no point exceeds about 5°.